Oct. 6, 1925. Des. Re. 16,182
M. H. HARRIS
SCREEN
Original Filed April 6, 1921
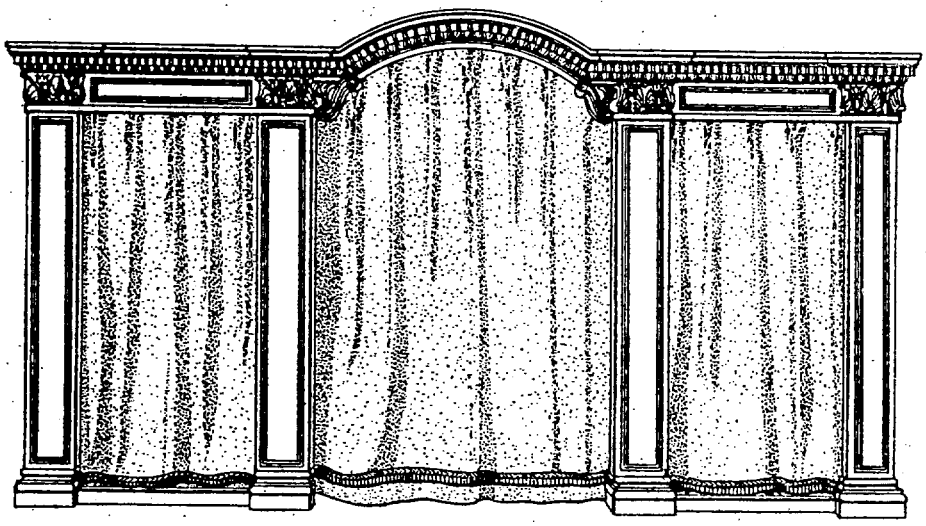
Moses Hiram Harris
Inventor
By his Attorney Reissued Oct. 6, 1925.

Design Re. 16,182

UNITED STATES PATENT OFFICE.

MOSES HIRAM HARRIS, OF NEW YORK, N. Y.

DESIGN FOR A SCREEN.

Original No. 65,186, dated July 15, 1924, Serial No. 459,168, filed April 6, 1921, for 3½ years. Application for reissue filed November 25, 1924. Serial No. 11,470. Term of patent 14 years.

*To all whom it may concern:*

Be it known that I, MOSES HIRAM HARRIS, a citizen of the United States, residing at New York city, in the county and State of New York, have invented a new, original, and ornamental Design for a Screen, of which the following is a specification, reference being had to the accompanying drawing, forming part thereof.

The figure is a front elevational view of a screen showing my new design.

I claim:

The ornamental design for a screen, as shown.

In testimony whereof I affix my signature.

MOSES HIRAM HARRIS.